Patented Feb. 9, 1926.

1,572,638

UNITED STATES PATENT OFFICE.

JOSEPH BRESLAUER AND CHARLES GOUDET, OF GENEVA, SWITZERLAND, ASSIGNORS TO SOCIÉTÉ D'ETUDES CHIMIQUES POUR L'INDUSTRIE, OF GENEVA, SWITZERLAND, A CORPORATION OF SWITZERLAND.

PROCESS FOR THE MANUFACTURE OF SALTS OF UREA.

No Drawing. Application filed May 2, 1922. Serial No. 557,964.

*To all whom it may concern:*

Be it known that we, JOSEPH BRESLAUER and CHARLES GOUDET, both citizens of Switzerland, residing at Geneva, Canton of Geneva, in the Confederation of Switzerland, have invented certain new and useful Improvements in Processes for the Manufacture of Salts of Urea, of which the following is a specification.

In order to prepare urea nitrate starting from cyanamides, free cyanamide is generally treated in aqueous solution with nitric acid. The acid converts the cyanamide into urea and the latter into urea nitrate, which is difficult to dissolve.

The principal faults of this process are the following:—

1. The solutions of free cyanamide, which are generally very dilute, have to be concentrated by evaporation, either at ordinary pressure, or in a vacuum. According to one of the recent patents relating to this preparation, the concentration should be continued until a syrupy consistency is reached. Moreover, it is impossible to evaporate economically aqueous solutions of cyanamide: this substance being volatile with steam and also very subject to polymerization. The yields of cyanamide becoming thus very low, it is obvious that the production of urea nitrate will likewise be low.

2. The nitric acid being a comparatively expensive acid, it is evident that any preparation based on the use of this product should be capable of bearing the high cost of raw material.

The process which forms the subject of this invention has for its object to overcome these disadvantages.

According to this process there is prepared a solution of cyanamide which by successive extractions becomes as concentrated as possible, and this solution is converted into a salt of urea by the addition of sulphuric acid and of the quantity equivalent to this acid of a salt containing the acid radical of the salt of urea to be prepared. This salt may be for example, a nitrate, etc., of an alkali metal (sodium, potassium) or ammonium, of an alkali earth metal (calcium, magnesium) etc.

For carrying this process into practice one may proceed for example in the following manner:

The calcium cyanamide is first decomposed by carbonic acid in the presence of water and there is obtained a solution of free cyanamide which is filtered in order to free it from calcium carbonate, carbon and other insoluble impurities. This operation is repeated with the filtered solution which thus serves for successive extractions, in order to be able to obtain as great a concentration as possible of cyanamide. In view of the instability of concentrated solutions of this substance, more especially in the presence of weak bases, care should be taken to avoid prolonged contact of the solutions with the calcium cyanamide; it is on the other hand necessary to free the residue completely from all traces of free cyanamide retained by the carbon and the calcium carbonate. In order to obtain these results without compromising the object sought, the solutions used for the multiple extractions will be kept under supervision, taking care to render them slightly acid by adding small quantities of acid or by keeping them out of contact with the air, that is to say, preferably in an atmosphere of carbon dioxide which is introduced if possible under pressure.

The concentrated solution of cyanamide obtained is either treated directly by concentrated nitric acid or preferably sulphuric acid of 53° or 60° Baumé is added and a corresponding quantity of a nitrate, such as that of ammonium, magnesium, etc.

It is allowed to stand during the night and the mixture is heated on a water bath until the free cyanamide has completely disappeared, which generally requires from one to two hours.

The urea nitrate formed is deposited cold in the form of transparent glistening plates or lamellar crystals and can be easily separated by filtration from the sulphate of ammonium, potassium, magnesium, etc.

In the case where the final product is intended for use as a fertilizer in agriculture, the mixture of urea nitrate and ammonium sulphate or potassium sulphate may be used as it is without previous separation, in order to prevent danger of explosion.

In view of the fact that the acids (sulphuric acid and nitric acid) which are used for converting the cyanamide, can be employed within certain limits in variable quantities, one can also obtain mixtures containing free urea and urea nitrate, or rather of urea, urea nitrate and sulphates of alkali metals and those of ammonium, magnesium, etc.

The same process may serve for the preparation of other relatively insoluble salts of urea and may finally by reversing the procedure, be used for making soluble salts of urea and insoluble salts of metals (for example alkaline earth metals) and more especially of calcium.

Thus by treating calcium chloride and cyanamide with sulphuric acid, calcium sulphate and urea chloride can be obtained. This last method of operation obviously does not present the same advantages as the reactions mentioned above.

Instead of using sulphuric acid and the salt in question or any other combination of this kind (an inexpensive acid and salts of expensive acids), one can obviously as mentioned above treat the concentrated solution of cyanamide directly with the expensive acid, such as nitric acid.

The ammonium sulphate in solution, separated by filtration from crystals of urea nitrate, as described above, can be again converted into ammonium nitrate by treatment of the concentrated solution with calcium nitrate. The calcium sulphate is precipitated and absorbs two molecules of water, being converted into plaster of Paris. The ammonium nitrate in very concentrated solution is evaporated to dryness and can be used again. One can also dry directly the mixture of calcium sulphate and ammonium nitrate and use it as it is as a fertilizer in agriculture.

We claim:

1. A process for the manufacture of insoluble salts of urea from cyanamides consisting in producing a concentrated solution of free cyanamide by extraction and adding thereto sulphuric acid and a quantity equivalent to this acid of a salt containing the acid radical of the salts of urea to be prepared so as to convert the solution directly into the salt.

2. A process for the manufacture of insoluble urea nitrate from cyanamides consisting in producing a concentrated solution of free cyanamide by extraction and then converting this solution into urea nitrate by adding sulphuric acid and a quantity equivalent to this acid of an alkali metal nitrate so as to obtain urea nitrate directly.

3. A process for the manufacture of urea nitrate from cyanamides consisting in producing a concentrated solution of free cyanamide by extraction and then converting this solution into urea nitrate by adding sulphuric acid and a nitrate salt thereto.

In testimony whereof we have affixed our signatures.

JOSEPH BRESLAUER.
CHARLES GOUDET.